(12) United States Patent
Ito (10) Patent No.: US 7,866,431 B2
(45) Date of Patent: Jan. 11, 2011

(54) RIDER SEAT FOR MOTORCYCLE

(75) Inventor: Masamoto Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 12/060,433

(22) Filed: Apr. 1, 2008

(65) Prior Publication Data

US 2008/0246315 A1 Oct. 9, 2008

(30) Foreign Application Priority Data

Apr. 4, 2007 (JP) .............................. 2007-098812

(51) Int. Cl.
- *B62D 61/02* (2006.01)
- *B62J 1/00* (2006.01)
- *B62K 11/00* (2006.01)

(52) U.S. Cl. ........................ 180/219; 224/414; 280/883; 297/195.1; 297/201

(58) Field of Classification Search ................. 180/219, 180/220; 224/412, 413, 414, 423; 280/202, 280/212, 288.4, 833, 835; 297/195.1, 195.12, 297/195.13, 201, 202, 215.1

See application file for complete search history.

(56) References Cited

U.S. PATENT DOCUMENTS

| | | | |
|---|---|---|---|
| 4,460,057 A * | 7/1984 | Kohyama | 180/210 |
| 6,761,401 B1 * | 7/2004 | McGlynn | 297/215.12 |
| 7,252,171 B2 * | 8/2007 | Augustine, Jr. | 180/219 |
| 2005/0045400 A1 * | 3/2005 | Osada | 180/219 |
| 2007/0122671 A1 * | 5/2007 | Shimizu et al. | 429/26 |
| 2007/0231626 A1 * | 10/2007 | Kurosawa | 429/13 |
| 2008/0156558 A1 * | 7/2008 | Otsubo et al. | 180/219 |

FOREIGN PATENT DOCUMENTS

| | | |
|---|---|---|
| CN | 2410217 Y | 12/2000 |
| CN | 2602996 Y | 2/2004 |
| JP | 2004-66937 A | 3/2004 |

\* cited by examiner

*Primary Examiner*—Tony H. Winner
*Assistant Examiner*—Marc A Scharich
(74) *Attorney, Agent, or Firm*—Birch, Stewart, Kolasch & Birch, LLP (57) ABSTRACT

To ensure that a fuel supply port or hydrogen gas charge port located on the lower side of a seat for a rider in a motorcycle can be opened and closed with less burden. A crosswise groove is provided between a driver's seat and a pillion of the seat for a rider. The pillion is provided with a longitudinal groove extending in the longitudinal direction of the vehicle body. A charge port is located on the lower side of the crosswise groove. A pad to be fitted in the crosswise groove covers the charge port. An arm as a support member of the pad is contained in the longitudinal groove. In the condition where the arm is set upright and the pad is set upright, the pad is inverted and a cushion part thereof faces forward, thereby providing a backrest for the passenger at the pillion.

16 Claims, 10 Drawing Sheets

RIDER SEAT FOR MOTORCYCLE

CROSS-REFERENCE TO RELATED APPLICATIONS

The present application claims priority under 35 USC 119 to Japanese Patent Application No. 2007-098812 filed on Apr. 4, 2007 the entire contents of which are hereby incorporated by reference.

BACKGROUND OF THE INVENTION

1. Field of the Invention

The present invention relates to a seat for a rider of a motorcycle. More specifically, to a seat for a rider of a motorcycle wherein on a lower side of the seat a fuel supply source such as a fuel cylinder is disposed which can be used for multiple purposes, not only as the seat for a rider.

2. Description of Background Art

A seat for a rider of a motorcycle is known wherein on the lower side of the seat a fuel supply source such as a fuel cylinder is disposed. For example, Japanese Patent Laid-Open No. 2004-66937 discloses a motorcycle wherein an oil supply port of a fuel tank is disposed on the rear side of a luggage box openable to the upper side, and the upper opening part of the luggage box and the fuel supply port are covered with a seat for a rider capable of opening and closing. See, for example, Japanese Patent Laid-Open No. 2004-66937.

A conventional seat for a rider capable of covering simultaneously a luggage box and a fuel supply port is long and comparatively heavy, so that it is necessary to open and close the whole part of the seat for a rider covering a large luggage box aperture even in the case of supplying oil where it suffices to expose only the small oil supply port. In addition, in a motorcycle of the type of having a seat for a rider on the lower side of which only a fuel tank is disposed and no luggage box is provided, the seat for a rider is only opened and closed at the time of supplying fuel. Thus, the opening/closing structure of the seat for a rider is not utilized sufficiently.

SUMMARY AND OBJECTS OF THE INVENTION

It is an object of an embodiment of the present invention to provide a seat for a rider of a motorcycle wherein only a required minimum part corresponding to a structure disposed on the lower side thereof is configured so that it can be opened and closed and the openable/closable part can be used for multiple purposes.

In order to solve the above problems, according to an embodiment of the present invention a seat for a rider of a motorcycle is provided having a fuel supply port disposed on the lower side of the seat for a rider, a pad constituting a part of the seat for a rider is disposed at a position for covering the upper side of the supply port; and the pad is attached to the supply port so as to be capable of being opened and closed.

In addition, according to an embodiment of the present invention a seat for a rider of a motorcycle is provided having a fuel supply port disposed on the lower side of the seat for a rider. The seat for a rider includes a pad supported by a support member so as to be displaceable between a position on the upper side of the supply port and a position retracted from the upper-side position so as to open the supply port to the exterior. In addition, the pad and the support member are so disposed so as to sink to the lower side from an upper surface of the seat for a rider when the pad is located in the upper-side position.

In addition, according to an embodiment of the present invention the pad is displaceable through swiveling by the support member, and the position of the pad is set so that the pad functions as a backrest for the rider when the support member is set upright.

In addition, according to an embodiment of the present invention the support member is pivotally supported on a rear part of a pillion. When the pad is located in the position on the upper side of the supply port, the support member sinks into a longitudinal recess formed in an upper surface of the pillion and the pad sinks into a crosswise recess formed between a driver's seat and the pillion.

Further, according to an embodiment of the present invention the pad has a cushion part, and the pad and the support member are linked to each other so that the cushion part faces upwards when the pad is in the position on the upper side of the supply port, and the cushion part is turned to be displaced to the lower side and to face forwards when the support member is in an upright position.

In addition, according to an embodiment of the present invention a seat for a rider of a motorcycle includes a fuel support port disposed on the lower side of the seat for a rider. The seat for a rider includes a pad supported at both left and right ends thereof by a support member so as to be displaceable between a position on the upper side of the supply port and a position retracted from the upper-side position so as to open the supply port to the exterior. The pad is disposed so as to sink to the lower side from an upper surface of the seat for a rider when the pad is located in the upper-side position.

Furthermore, according to an embodiment of the present invention the motorcycle is a fuel cell powered vehicle and the supply port is a charge port through which a hydrogen gas reservoir tank is charged with hydrogen gas which is used in a fuel cell.

According to an embodiment of the present invention, the fuel supply port located on the lower side of the seat for a rider can be opened and closed by only opening and closing the pad, without displacing the seat for a rider as a whole.

According to an embodiment of the present invention, the fuel supply port located on the lower side of the seat for a rider can be covered and be opened to the exterior by only displacing the pad supported by the support member.

According to an embodiment of the present invention, the pad is swivelably supported by the support member, and the rider can lean on the pad when the support member is in the upright position.

According to an embodiment of the present invention, the fuel supply port on the lower side of the seat for a rider can be covered with the pad when the pad and the support member sink into the recess formed on the seat for a rider.

According to an embodiment of the present invention, when the support member is laid flat, the cushion part of the pad faces upwards, which is convenient for providing seating for the rider. When the support member is set upright, the cushion part is turned to face forwards and displaced to the lower side for providing a backrest for the rider.

According to an embodiment of the present invention, the support members for supporting the pad are located at both left and right ends of the pad. When the pad is sunken to the lower side from the upper surface of the seat for a rider, the support members at the left and right of the pad can be utilized as left and right extension parts of the seat for a rider, and a wide luggage carrier surface can be secured.

According to an embodiment of the present invention, the hydrogen gas charge port located on the lower side of the seat for a rider can be opened and closed by only opening and closing the pad, without displacing the seat for a rider as a whole.

According to an embodiment of the present invention, a fuel supply port or a gas charge port can be covered and exposed by only moving up and down the pad which is a part of the seat for a rider, without moving up and down the seat for a rider as a whole, thereby reducing operational labor of a fuel supply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
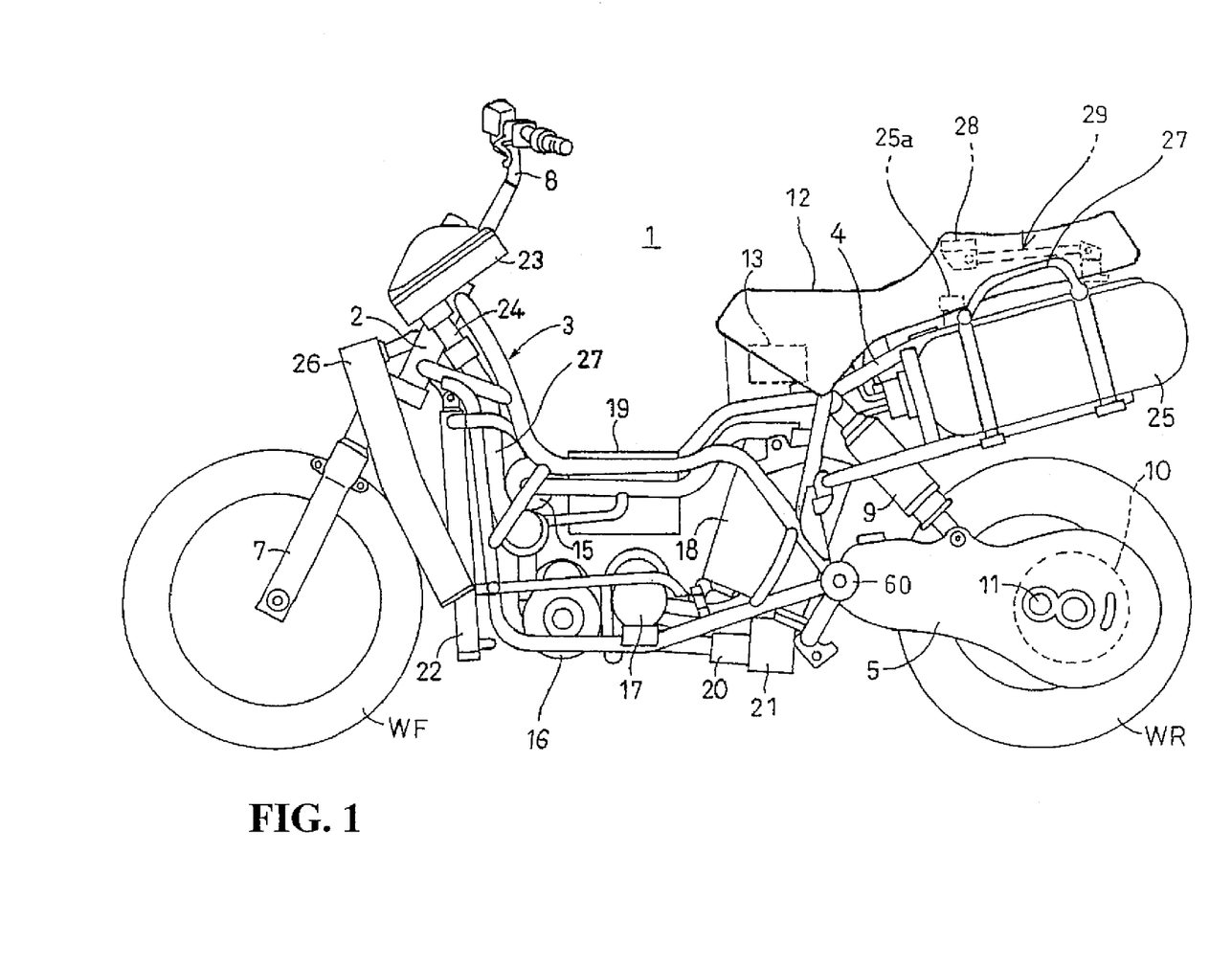
FIG. 1 is an exploded side view of a fuel cell powered motorcycle according to an embodiment of the present invention.

Now, an embodiment of the present invention will be described below referring to the drawings. FIG. 1 is an exploded side view of a fuel cell powered motorcycle as an example of a motorcycle having a seat for a rider according to an embodiment of the present invention. The fuel cell powered motorcycle has a fuel generator system including a hydrogen supply system, an oxygen supply system, and a cell stack (inclusive of electrodes, a separator, an electrolyte, etc.), for generating electrical energy through an electrochemical reaction. Herein, the cell stack and a casing (inclusive of members attached to the casing) for containing the same are collectively referred to as a fuel cell.

In FIG. 1, the fuel cell powered motorcycle 1 has a main frame 3 joined at its front part to a head pipe 2, a rear frame 4 joined to a rear part of the main frame 3 and extending further rearwardly with a swing unit 5 swingably pivotally supported on a bearing 60 provided on the lower side of a rear part of the main frame 3. A steering stem (not shown) is turnably supported on the head pipe 2, and a front fork 7 for supporting a front wheel WF is connected to the lower end of the steering stem. A steering handle 8 is connected to the upper end of the steering stem. A rear shock absorber 9 is connected at its upper end to the main frame 3 and extends towards a skewly rear lower side. The swing unit 5 is connected to the lower end of the rear shock absorber 9. The swing unit 5 is provided with an electric motor 10 as a prime mover in the motorcycle 1, and a rear wheel WR is connected to a rear axle 11 driven by the electric motor 10. A controller, or an ECU 13, is provided on the upper side of the main frame 3 and the rear frame 4. A seat for a rider 12 is provided along the rear frame 4 so as to cover the ECU 13.

The main frame 3 is formed to be cradle-like, or cage-like, in overall shape, and a water pump 15, a supercharger 16, a humidifier 17, a fuel cell 18, and a VCU (voltage control unit) 19 are contained in a space surrounded by the cage-like main frame 3. More specifically, the water pump 15 is disposed at a front upper part of the inside of the main frame 3, the supercharger 16 and the humidifier 17 are disposed on the lower side of a central part of the inside, and the VCU 19 is disposed on the upper side of the supercharger 16 and the humidifier 17. The fuel cell 18 is accommodated on the lower side of the ECU 14 at a rearmost part of the main frame 3, i.e., at a part just on the front side of the bearing 60. The fuel cell 18 has a case which has a rectangular shape in side view, and is disposed so that the rectangle is elongate vertically.

A catch tank (gas-liquid separator) 20 and a dilution box 21 are provided on the lower side of the fuel cell 18. In addition, a cooling water radiator 22 for the fuel cell 18 is provided on the front side of the main frame 3, and an air cleaner 23 is provided so as to surround the upper side of the head pipe 2. Air introduced into the air cleaner 23 is fed through an air flow sensor 24 into the supercharger 16, and is supplied through the humidifier 17 to the fuel cell 18. A pair of hydrogen cylinders 25 are provided as a fuel supply source for supplying hydrogen to the fuel cell 18 and are mounted on the rear frame 4 at left-side and right-side positions. Hydrogen contained in the hydrogen cylinders 25 is subjected to pressure reduction by a regulator, before being supplied to the fuel cell 18. A pair of batteries (for example, Ni-MH batteries) 26 are provided in a vertically elongate posture respectively on the left and right sides of the front fork 7.

Grab rails 27 are attached to the rear frame 4. The grab rails 27 are to be used by the passenger (pillion passenger) seated on a rear part of the seat for a rider 12, to be used when the motorcycle 1 is not running and the driver moves the motorcycle 1 by pushing the motorcycle. The grab rails 27 may be used at the time of operating a stand (not shown) and in like situations.

A charge port 25a through which to charge the hydrogen cylinder 25 with hydrogen gas is located on the lower side of the seat for a rider 12. A charge port cover member 29 is provided having a pad 28 capable of covering an upper part of the charge port 25a by being located on the upper side of the charge port 25a. The configurations of the seat for a rider 12 and the charge port cover member 29 will later be described in more details.

In the fuel cell 18, under the function of a fuel electrode (minus electrode), electrons are separated from hydrogen supplied from the hydrogen cylinder 25, and hydrogen ions produced by separation of electrons migrate through the electrolyte to an air electrode (plus electrode). On the other hand, a circuit is provided to ensure that the electrons separated from hydrogen return to the air electrode, where oxygen in air and the electrons having returned react with each other, to produce water vapor. As a result of this reaction, the electrons continuedly move through an external circuit, and an electric current flows accordingly. The electric power generated in the fuel cell 18 is once stored in the batteries 26, and is supplied therefrom to the motor 10.

Figure 2:
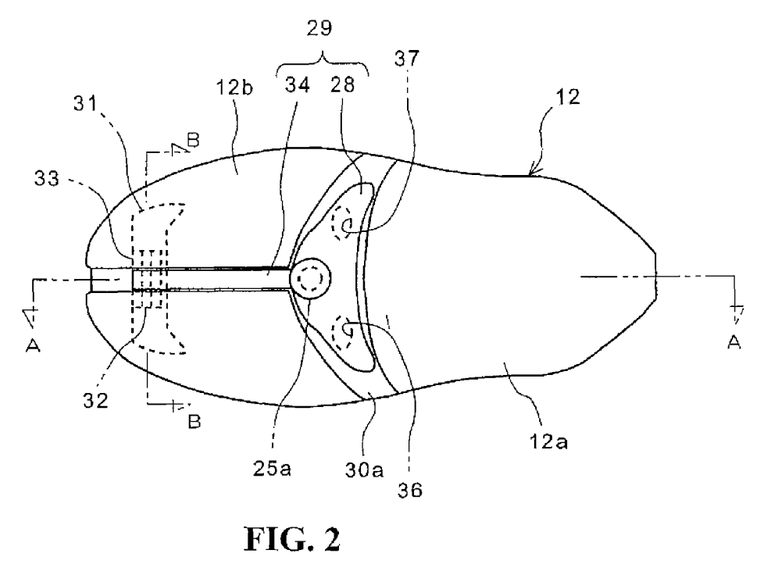
FIG. 2 is a plan view of a seat for a rider according to a first embodiment of the present invention.
Figure 3:
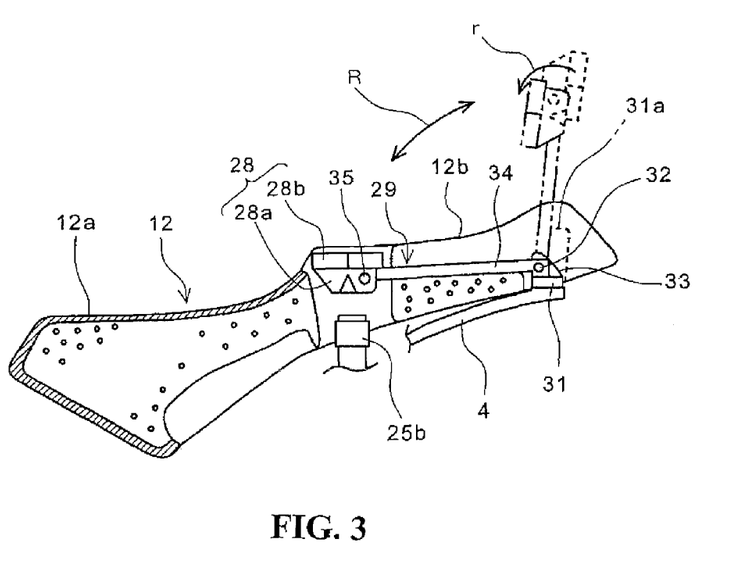
FIG. 3 is a sectional view taken along line A-A of FIG. 2.
Figure 4:
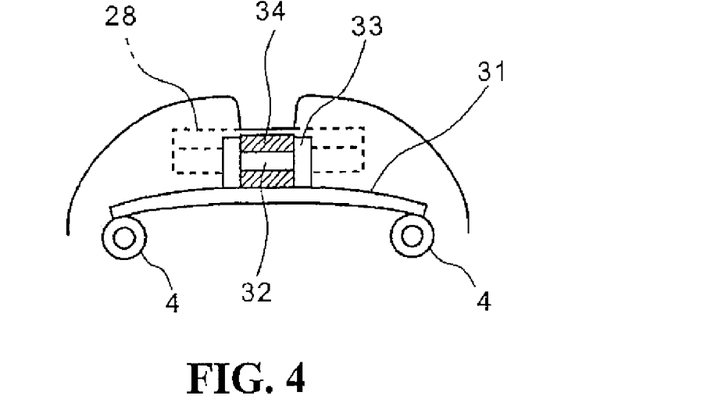
FIG. 4 is a sectional view taken along line B-B of FIG. 2.
Figure 5:
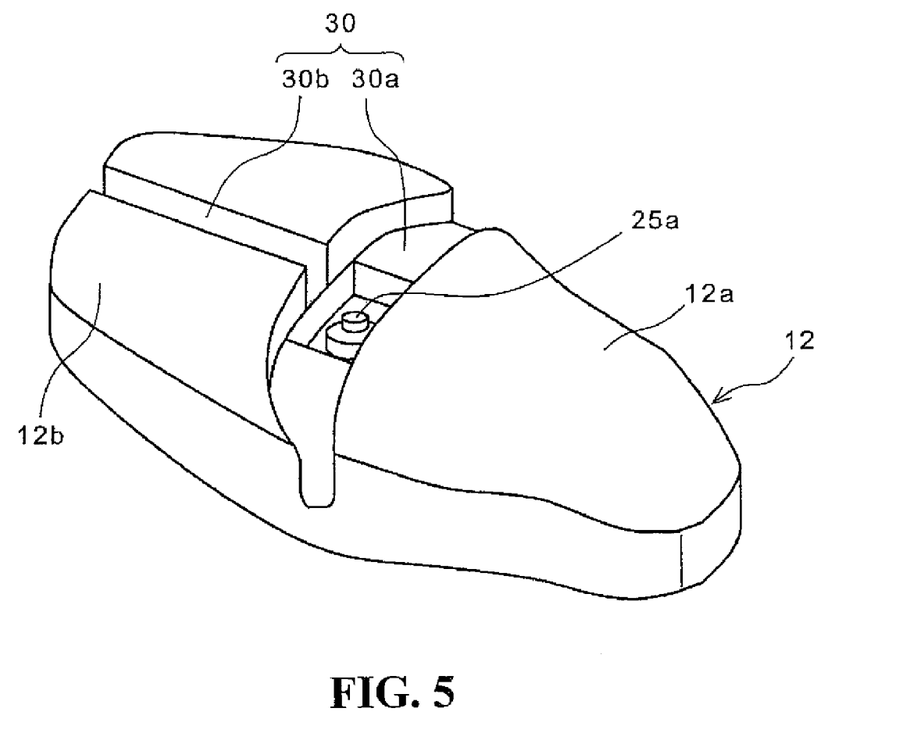
FIG. 5 is a perspective view of a seat for a rider in the condition where a charge port cover member is removed.

FIG. 2 is a plan view of the seat for a rider 12, FIG. 3 is a sectional view taken along line A-A of FIG. 2, FIG. 4 is a sectional view taken along line B-B of FIG. 3, and FIG. 5 is a perspective view of the seat for a rider in the condition where the charge port cover member 29 has been removed. In FIGS. 2-5, the seat for a rider 12 includes a driver's seat 12a and a passenger's seat (pillion) 12b on the rear side thereof. The pillion 12b is provided with a recess 30 such that the charge port cover member 29 can be contained therein. The recess 30 is composed of a crosswise groove 30a extending in the width direction of the seat for a rider 12 and a longitudinal groove 30b extending rearwards (toward the rear side of the vehicle body) from the crosswise groove 30. At a rear part position of the pillion 12b, a cross bar 31 is bridgingly disposed between the rear frames 4, 4 on the left and right sides of the vehicle body. The cross bar 31 is provided with a bracket 33 for holding both ends of a pivot 32 for turnably supporting the charge port cover member 29.

The charge port cover member 29 has an arm 34 supported by the pivot 32, and a pad 28 is attached to the tip of the arm 34. The arm 34 can be contained in the longitudinal groove 30b, whereas the pad 28 can be contained in the crosswise groove 30a. The crosswise groove 30a penetrates the seat for a rider 12, at least at a part where the charge port 25a is located on the lower side, so that the charge port 25a is visible from the upper side. The crosswise groove 30a is formed to penetrate the seat for a rider 12. In addition, the crosswise groove 30a may penetrate the seat for a rider 12 in the thickness direction, not only at the part where the charge port 25a is located on the lower side but also in the whole range along the width direction of the seat for a rider 12. In other words, the driver's seat 12a and the pillion 12b may be provided as separate bodies. The charge port 25a can be covered with the pad 28 so as to be invisible from the exterior, by containing the charge port cover member 29 in the crosswise groove 30a.

The charge port cover member 29 can be turned about the pivot 32 in the directions indicated by arrows R, between a contained position (substantially horizontal position) where it is contained in the seat for a rider 12 and a non-contained position (substantially vertical position). The pad 28 includes a base part 28a which is supported on a shaft 35 so that it can be turned through 180° relative to the arm 34, and a cushion part 28b formed from a material rich in elasticity such as polyurethane foam. In the contained position, the pad 28 is contained in the crosswise groove 30a, with the cushion part 28b facing upwards. On the other hand, in the non-contained position, the cushion part 28b can be set to face toward the vehicle body front side, at a position deviated downwards and inverted relative to the arm 34 by turning the cushion part 28b through 180° in a counterclockwise direction (in the direction of arrow r) in the FIG. 3. With the arm 34 put in the non-contained position, the cushion part 28b of the pad 28 thus inverted can be utilized as a backrest for the pillion passenger.

In addition, since in the contained position the shaft 35 is disposed nearer to the base of the arm 34 (namely, nearer to the pivot 32) in relationship to the pad 28, the pad 28 naturally starts an inverting motion under gravity during the process of the erection of the arm 34 from the contained position to the non-contained position. The arm 34 can have a stopper 31a erecting upwards from the bracket 31 on the rear side of the pivot 32 so that the arm 34 will not be tilted toward the vehicle body rear side from the non-contained position.

When the motorcycle 1 is operated with the driver and a pillion passenger thereon, the charge port cover member 29 can be utilized as a backrest for the passenger by setting it upright. In addition, when the motorcycle 1 is operated with only the driver thereon, the charge port cover member 29 can be utilized as a waist rest (backrest) for the driver by tilting it up to an arbitrary position between the contained position and the non-contained position.

Figure 6:
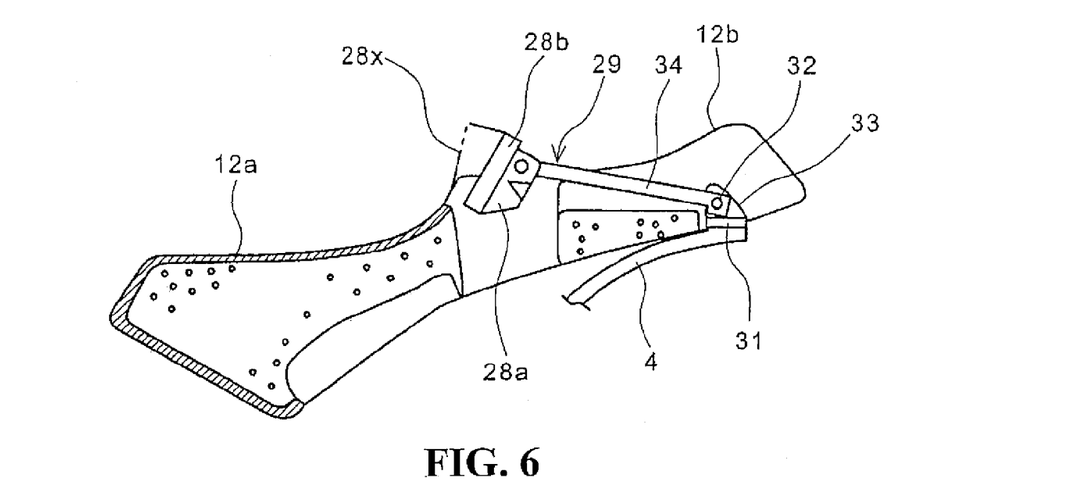
FIG. 6 is a side view of a seat for a rider in the condition where the charge port cover member is used as a backrest for the driver's seat.

FIG. 6 is a view showing the condition where the charge port cover member 29 is tilted up to the position where it is utilized as the backrest for the rider. In order to hold the charge port cover member 29 in this position, a ratchet mechanism is provided between the pivot 32 and the bracket 33. In addition, the arm 34 is preferably so configured that it can be extended and contracted for adjustment of the length thereof. In FIG. 6, the position of the pad 28 in the condition where the arm 34 is extended is indicated by chain line and denoted by symbol 28X.

As above-mentioned, the charge port cover member 29 functions to cover the hydrogen gas charge port 25a. In this case, naturally, the charge port cover member 29 can not only cover the charge port 25a but also cover other elements arranged within the range which can be covered by the pad 28. For example, a configuration as shown in FIG. 2 may be adopted wherein electrical signal input and output ports 36, 37 are arranged on the lower side of the passenger's seat 12 adjacently to the charge port 25a, and they are kept covered with the pad 28 when not used. The input and output ports 36, 37 are, for example, intercom jacks. In the case where a system for communication between the driver and the passenger by utilizing an intercom is mounted on the motorcycle 1, the jacks have often been arranged on a panel in the vicinity of the steering handle. In the case where the passenger utilizes the jacks arranged on the lower side of the passenger's seat 12, the jacks of the intercom, or the input and output ports 36, 37, covered with the pad 28 can be exposed by tilting up the charge port cover member 29, so that the passenger can connect and disconnect headphone and microphone cords to and from the input and output ports 36, 37 by himself, without needing the driver's help. In addition, there is no need to extend the cords from the pillion 12b to the vicinity of the steering handle for communication utilizing the intercom.

Figure 7:
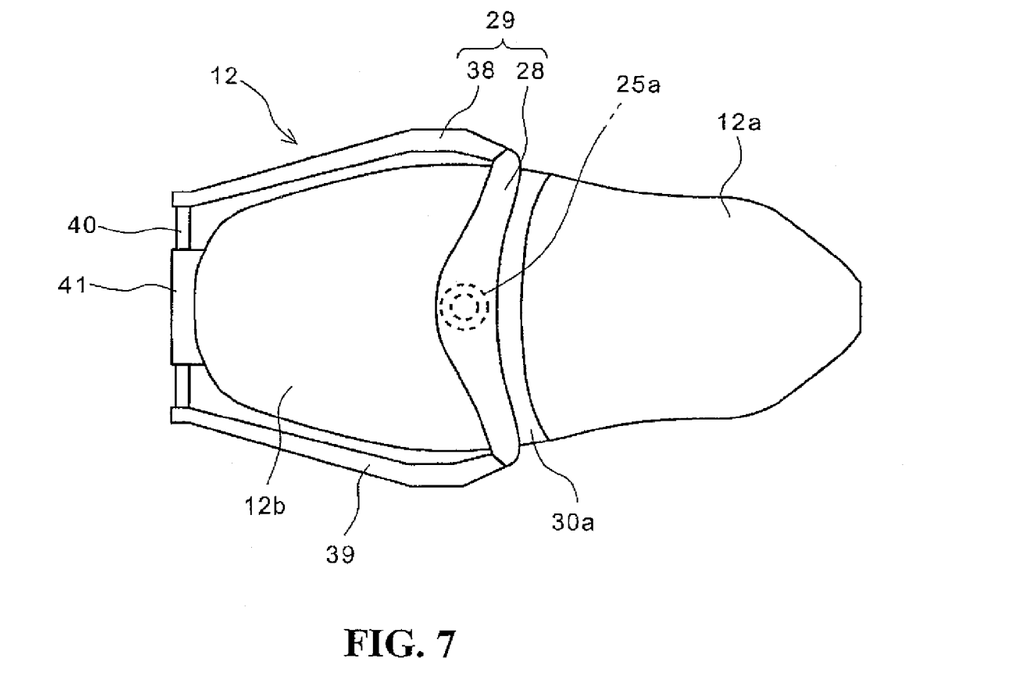
FIG. 7 is a plan view of a seat for a rider according to a second embodiment of the present invention.

A second embodiment of the present invention is described below. FIG. 7 is a plan view of a seat for a rider according to the second embodiment. In the first embodiment above, the charge port cover member 29 was supported on the vehicle body by use of the single arm 34. However, such a configuration is not limitative, and the pad 28 can be supported as shown in FIG. 7. In this embodiment, the pillion seat 12b is not provided with any longitudinal groove 30b, and only a crosswise groove 30a for containing the pad 28 is provided between the driver's seat 12a and the pillion 12b. The pad 28 is supported by two arms 38, 39 disposed along left and right edges of a rear part of the seat for a rider 12. A bearing 41 for supporting a pivot 40 for the arms 38, 39 is provided at a rearmost part of the seat for a rider 12. Rear end parts of the arms 87, 39 are pivotally supported by the bearing 41, and the tips of the arms 38, 39 are connected respectively to both left and right ends of the pad 28. The bearing 41 may be provided with a ratchet mechanism so that the arms 38, 39 can be fixed at intermediate positions within a predetermined turning range, in the same manner as in the first embodiment.

According to the second embodiment, the bearing 41 is provided at the rearmost part of the seat for a rider 12. Therefore, when the charge port cover member 29 is set upright, the pillion 12*b* can be used widely, and a wide space for putting luggage can be secured. For example, a helmet can be placed and a chin strap and the like can be fixed to the arms 38, 39.

When the charge port cover member 29 is set upright, the pad 28 can be utilized as a backrest at the pillion 12*b*. In addition, where the pad 28 of the charge port cover member 29 is contained in the contained position (in the crosswise groove 30*a*), a wider seat inclusive of the arms 38, 39 is realized, and the arms 38, 39 can be utilized as grips to be gripped by the pillion passenger.

Figure 8:
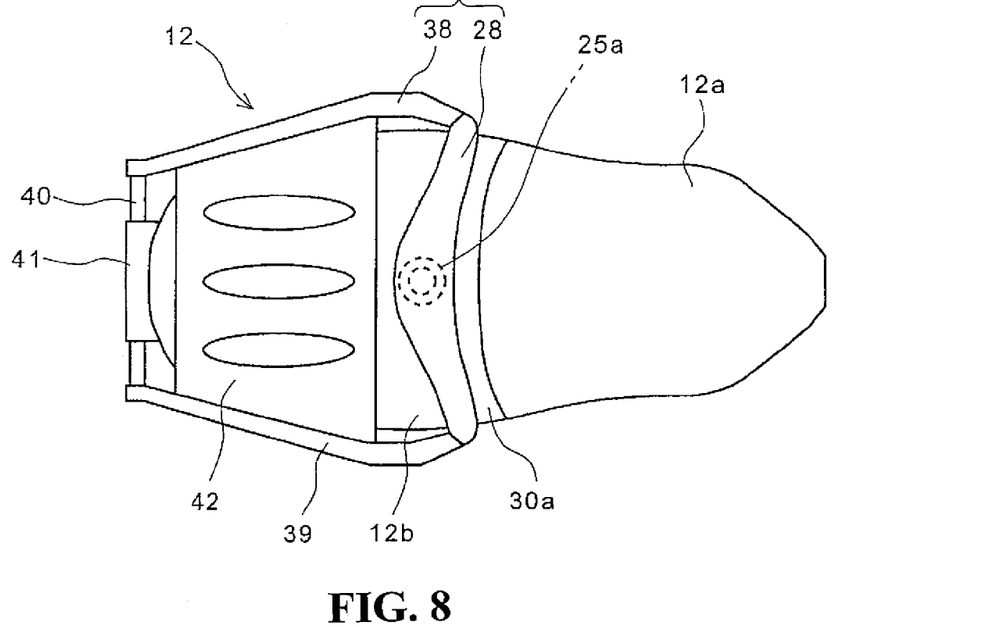
FIG. 8 is a plan view of a seat for a rider according to a modification of the second embodiment of the present invention.

Now, a modification of the second embodiment will be described. FIG. 8 is a plan view of a seat for a rider according to a modification of the second embodiment, and the same symbols as those in FIG. 7 denote parts which are the same as or equivalent to those described above. In the present embodiment, a plate 42 joined to the arms 38, 39 at both ends thereof is provided as a carrier. With the plate 402 thus provided, luggage put on the plate 42 can easily be held stably.

In addition, an elastic member, for example, a net formed by knitting rubber strings or the like may be bridgingly disposed between the arms 38, 39, in place of the plate 42. In this case, the luggage put on the pillion 12*b* is fixed by pressing it from above by the elastic member.

Figure 9:
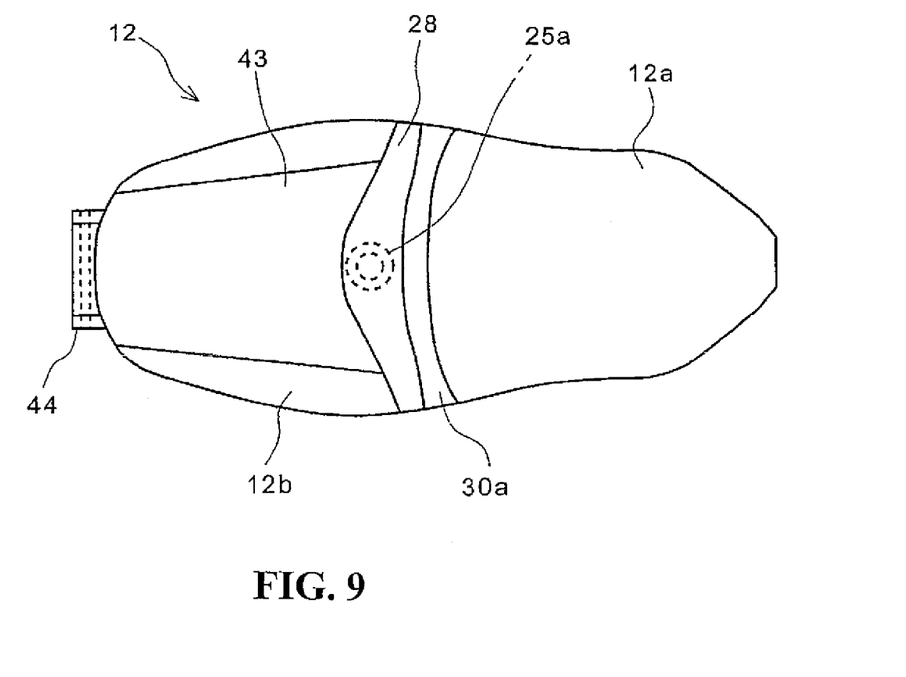
FIG. 9 is a plan view of a seat for a rider according to a second modification of the second embodiment of the present invention.

Further, a second modification of the second embodiment will be described. FIG. 9 is a plan view of a seat for a rider according to a second modification of the second embodiment. In this embodiment, a large-width bracket 43 is provided, in place of the arms for supporting the pad 28 of the charge port cover member 29. The bracket 43 is pivotally supported by a bearing 44 at a rearmost part of the seat for a rider 12, and the tip of the bracket 43 is connected to the pad 28. In order that the pillion passenger will not have an uncomfortable feeling, the bracket 43, at least the upper surface thereof, has a structure wherein the inside is packed with a cushioning material and the outside is covered with a material rich in elasticity, such as rubber, leather, artificial leather, etc.

In the second embodiment, there is no need to provide grooves or recesses, such as the longitudinal groove 30*b*, for containing the arms 38, 39 supporting the pad 28, and it suffices to provide the crosswise groove 30*a* for containing the pad 28. In addition, a recess for containing the bracket 43 may be formed in the upper surface of the pillion 12*b* so that the upper surface of the bracket 41 is continuous and flush with the surfaces of left and right end parts of the pillion 12*b*.

An example of the utilization of the charge port cover member 29, other than the use as the charge port cover member, will be described below. There are cases where a helmet storing space is needed when the passenger gets off the motorcycle 1. In the case where a luggage box for storing a bulky thing such as a helmet cannot be provided on the lower side of the seat for a rider 12, the helmet is often kept hung on a hook formed at a lateral side of the seat for a rider 12. In this case, however, there is an inconvenience in that the helmet protrudes in the vehicle width direction and rainwater or dust may enter into the helmet, since the helmet may be hung with the of the helmet inside facing upwards.

In the present embodiment, it is possible to put the helmet on the seat for a rider 12 and hold the helmet by use of the charge port cover member 29.

Figure 10:
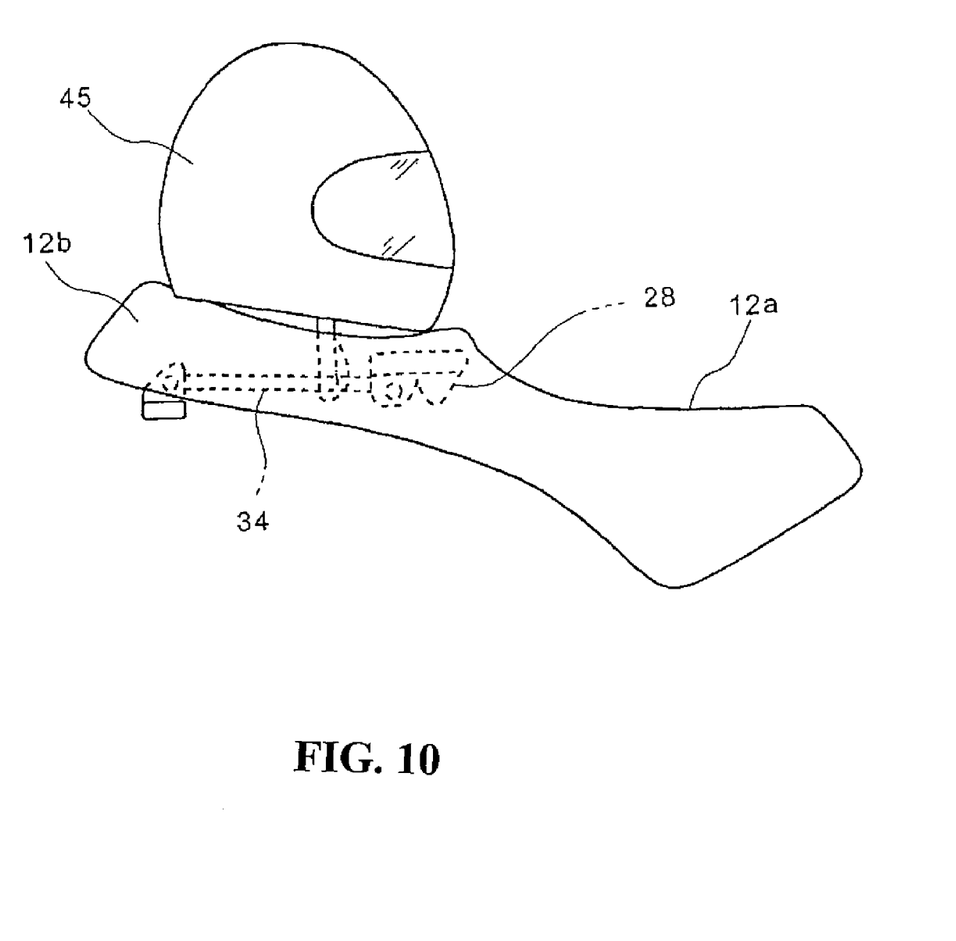
FIG. 10 is a side view of the seat for a rider according to the first embodiment, with a helmet fixed thereto.

FIG. 10 is a side view of the seat for a rider with the helmet fixed thereto. In FIG. 10, the helmet 45 is put on the pillion 12*b*, and a chin strap 45*a* of the helmet 45 is fixed by hooking it to the arm 34.

Figure 11A:
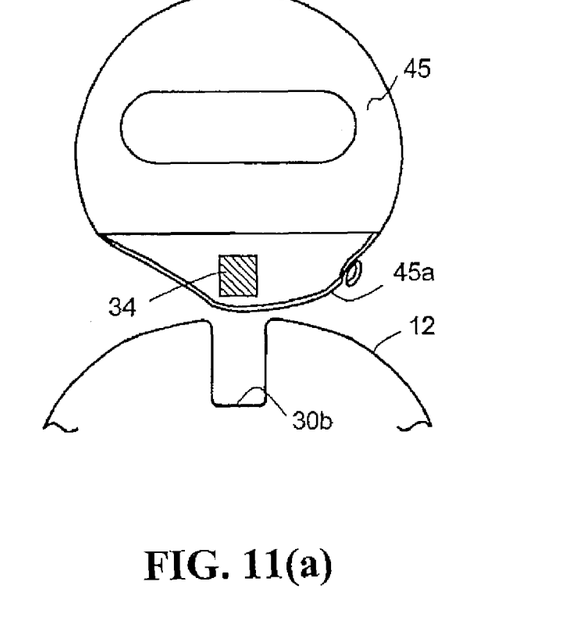
FIGS. 11(a) and 11(b) are cross-sectional views of an essential part of the seat for a rider in the preparatory condition for fixation of a helmet.
Figure 11B:
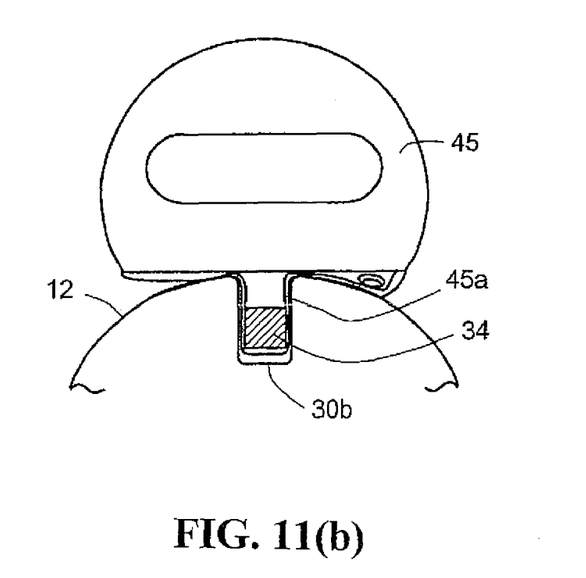

Referring to FIGS. 11(*a*) and 11(*b*), the method of fixing the helmet 42 is described further. In FIG. 11(*a*), the chin strap 45*a* of the helmet 45 is hooked by laying it around on the lower side of the arm 34, and thereafter, as shown in FIG. 11(*b*), the arm 34 is put into the contained position, namely, contained in a longitudinal groove 30*b*. As a result, the chin strap 45*a* is contained in the longitudinal groove 30*b* together with the arm 34, and the helmet 45 is kept on the seat for a rider 12.

Figure 12:
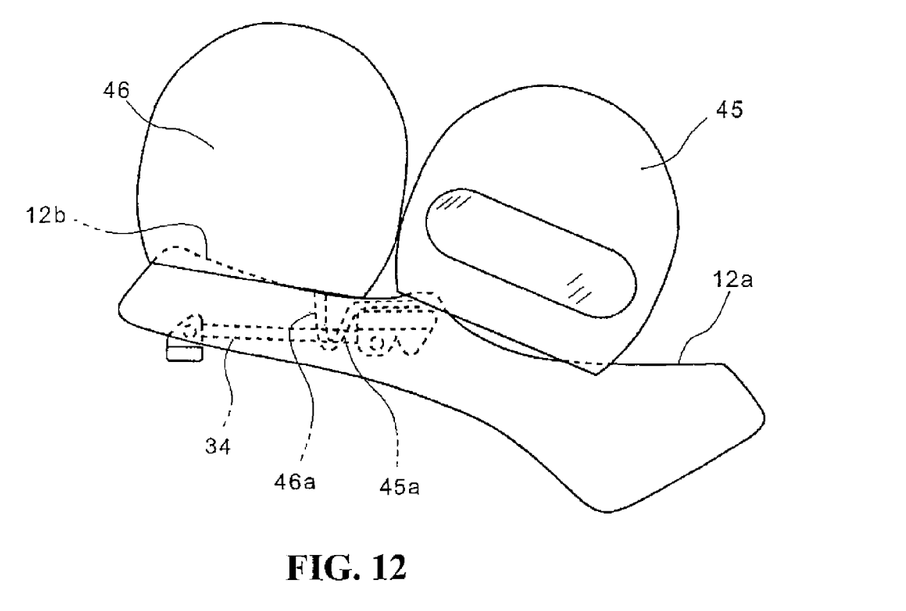
FIG. 12 is a cross-sectional view of an essential part of the seat for a rider after the helmet is fixed.

FIG. 12 is a sectional view of an essential part of the seat for a rider 12 with two helmets put thereon. In this example, the helmets 45, 46 are put respectively on the driver's seat 12*a* and the pillion 12*b*, and their chin straps 45*a*, 46*a* are fixed by hooking them onto the arm 34.

In addition, in order that the pad 28 is locked to the seat for a rider 12 or to a frame fixed to the seat for a rider 12 when contained in the crosswise groove 30*a*, the pad 28 is provided with a hook receiver, whereas a hook for locking with the hook receiver is provided on the side of the seat for a rider 12 or the frame fixed to the seat for a rider 12.

Figure 13:
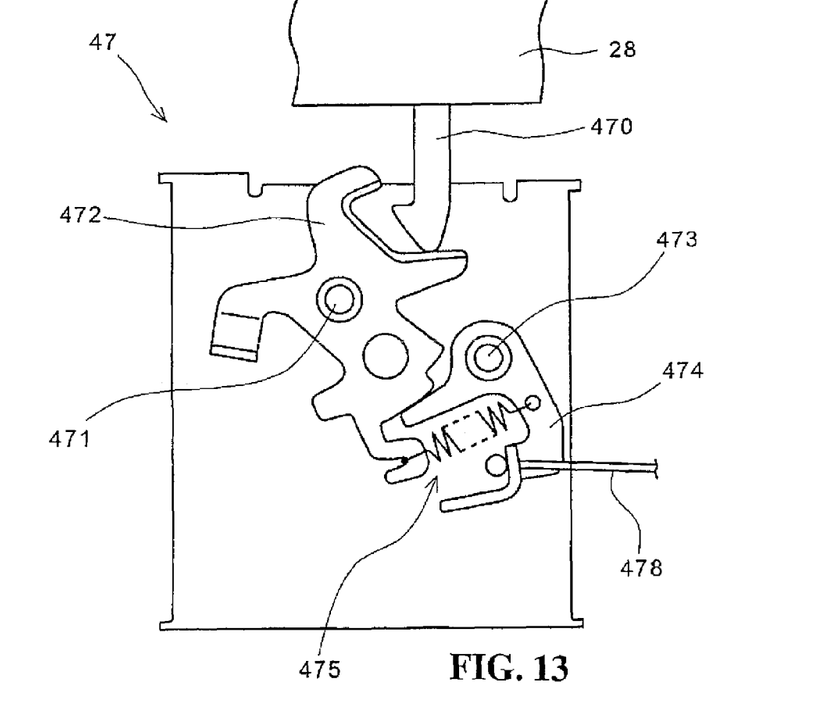
FIG. 13 is a front view of a hook and a hook receiver.
Figure 14:
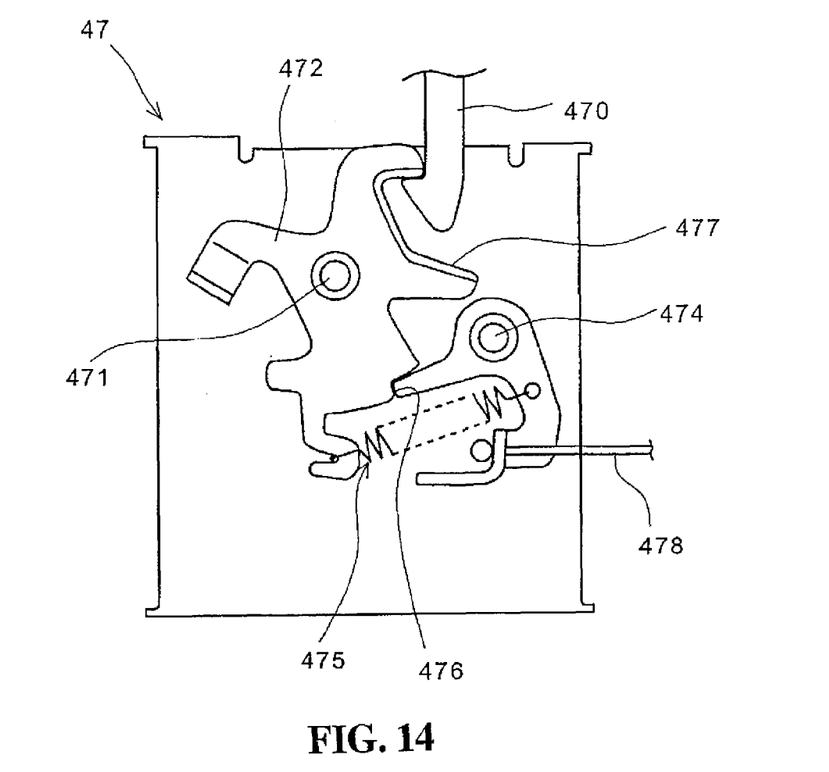
FIG. 14 is a front view of the hook and the hook receiver.

FIGS. 13 and 14 are front views showing a hook and a hook receiver. In FIG. 13, the pad 28 is provided with a hook 470 on the lower surface side in the condition where the pad 28 is contained in the crosswise groove 30*a*. A hook receiver (catch mechanism) 47 includes a cam plate 472 provided to be turnable about a shaft 471, a lock lever 474 provided to be turnable about a shaft 473, and a tension spring 475 for connection between the lower end of the cam plate 472 and one end of the lock lever 47. Due to the pulling by the tension spring 475, the cam plate 472 and the lock plate 474 are out of engagement, and the lock lever 474 is in the position of having turned clockwise in FIG. 13, whereas the cam plate 472 is in the position of having turned counterclockwise.

With the hook 470 pushed down starting from the condition of FIG. 13, the tip of the hook 470 abuts on an upwardly facing receiving surface 477 of the cam plate 472, and turns the cam plate 472 clockwise (see FIG. 14). Then, the other end of the lock lever 474 slides along an edge of the cam plate 472, and, upon falling to a step 476, it restrains the cam plate 472 from turning counterclockwise. In this condition, the hook 470 and the cam plate 472 are in engagement with each other, whereby the hook 470 is fixed.

In order to unlock the hook 470, an unlocking cable 478 is connected to the lock lever 474. With the unlocking cable 478 pulled, the lock lever 474 is turned counterclockwise, the cam plate 472 and the lock lever 474 are disengaged from each other, the cam plate 471 is turned counterclockwise, and the hook 470 and the cam plate 472 are disengaged from each other, resulting in that the pad 28 can be displaced upwards. In addition, as a lock mechanism including a hook and a hook receiver just mentioned above, for example, a known technology such as the one described in Japanese Patent Laid-open No. 2004-99008 can be utilized.

Figure 15:
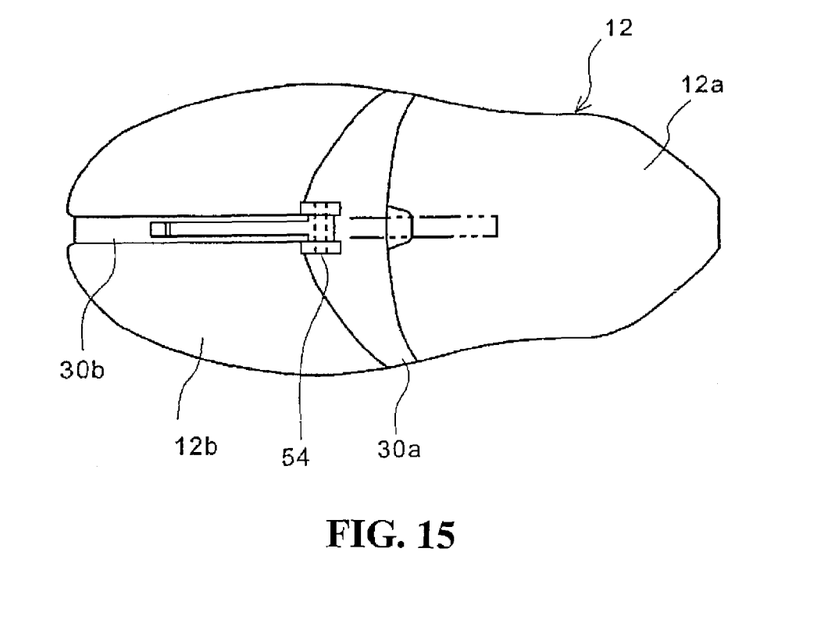
FIG. 15 is a plan view of a seat for a rider according to a third embodiment of the present invention.
Figure 16:
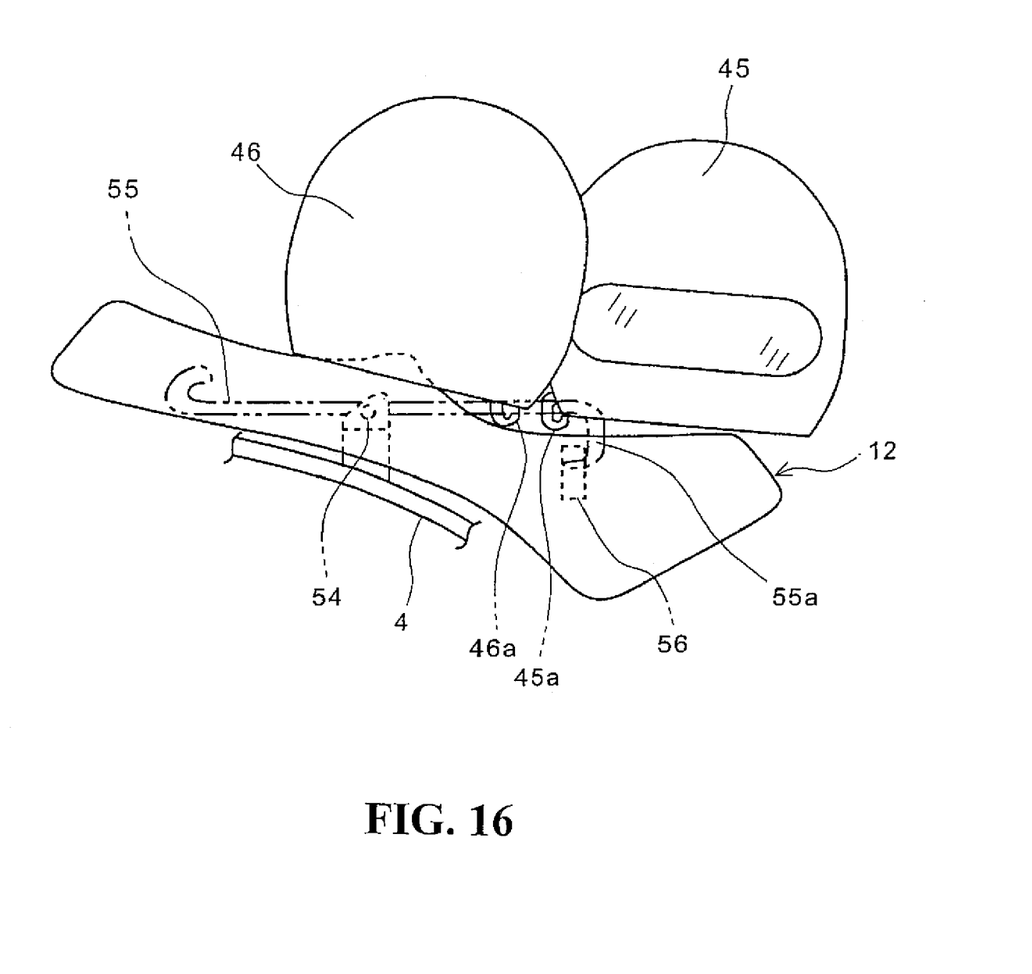
FIG. 16 is a side view of the seat for a rider according to the third embodiment of the present invention.

Now, a third embodiment of the present invention will be described below. In the third embodiment, an example of a seat for a rider capable of fixing a helmet and capable of playing an antitheft function for the vehicle is shown. FIG. 15 is a plan view of a seat for a rider according to the third embodiment, and FIG. 16 is a side sectional view of the same. In FIGS. 15 and 16, a pivot 54 extending in the vehicle width direction is disposed between a driver's seat 12a and a pillion 12b of the seat for a rider 12. The pivot 54 is provided on the seat for a rider 12 or on a rear frame 4 for supporting the seat for a rider 12. A helmet fixing lever 55 is supported on the pivot 54, and the helmet fixing lever 55 is turned in the vehicle front-rear direction, about the pivot 54. When in the position of having been turned maximally toward the rear side, the helmet fixing lever 55 is contained in a recess or groove 30 dividing the pillion 12b into left and right halves. On the other hand, when in the position of having been turned maximally toward the front side, the helmet fixing lever 55 abuts on the upper surface of the driver's seat 12a, when a hook 55a formed at the tip of the helmet fixing lever 55 can be engaged with a hook receiver 56 embedded in the driver's seat 12a, resulting in a locked condition. As a locking mechanism for the locking between the hook 55a and the hook receiver 56, the one described referring to FIGS. 13 and 14 can be utilized.

With this configuration, the helmets 45, 46 can be fixed onto the seat for a rider 12 by a method in which the chin straps 45a, 46a of the helmets 45, 46 are hooked onto the helmet fixing lever 55, and the helmet fixing lever 55 is turned toward the front side so as to engage the hook 55a with the hook receiver 56. At the time of using the helmets 45, 46, the hook 55a and the hook receiver 56 are disengaged from each other by use of a predetermined key, and the helmet fixing lever 55 is lifted up, whereby the chin straps of the helmets 45, 46 can be detached from the helmet fixing lever 55.

Thus, the helmets 45, 46 fixed to the seat for a rider 12 can be detached from the seat for a rider 12 only in the case where the predetermined key is used, which has an antitheft effect. In addition, if only the helmets 45, 46 should be detached without lifting up the helmet fixing lever 55, the helmet fixing lever 55 remains protruding to the upper side of the driver's seat 12a, so that no person can be seated on the driver's seat 12a, which has an antitheft effect on the vehicle itself.

Further, the chin strap of a helmet is generally provided with a fixture called a "D-ring" or "D-annulus" in view of its appearance. In the case of fixing the charge port cover member 29 having the arm 34 and the pad 28, the helmet can be fixed onto the seat for a rider 12 by engaging the D-ring directly with the hook receiver 49 provided in the seat for a rider 12.

In addition, the helmet fixing lever 51 can be used as an unlocking lever (lock-in lever) for a main stand storing lock. In general, a motorcycle is provided with a main stand for keeping the motorcycle standing by itself. A system called "lock-in" for locking the main stand so that the motorcycle cannot run is known (refer to Japanese Patent Laid-open No. 2001-213370). As an unlocking lever for the lock-in, the helmet fixing lever 51 is used. When the helmet fixing lever 51 and the main stand storing lock are connected by an unlocking cable and the helmet fixing lever 51 is turned toward the side of the pillion 12b, the unlocking cable is pulled, the main stand storing lock is unlocked, and the main stand is stored into a predetermined position, resulting in that the motorcycle can run.

While the present invention has been described according to the best modes for carrying out the invention, the invention is not limited to the embodiments, and various modifications can naturally be made by those skilled in the art. For example, the invention is not limited to a seat for a rider of a fuel cell powered vehicle, and is applicable also to a seat for a rider of a motorcycle with an internal combustion engine mounted therein and a seat for a rider of a hybrid type motorcycle in which an internal combustion engine and an electric motor are used in combination. In the motorcycle having an internal combustion engine as a prime mover, the hydrogen gas charge port is naturally modified into a supply port for a fuel for the internal combustion engine, such as gasoline. Further, the fuel cells are classified into the direct hydrogen type, the modified fuel type and the like, according to the fuel supply system. Accordingly, the charge port is configured in one of the types suited respectively to hydrogen, methanol, natural gas, gasoline, and so on. Furthermore, even in the direct hydrogen type, a respectively suitable charge port configuration is adopted, according to the form of hydrogen, namely, liquefied hydrogen, occluded hydrogen, and high-pressure gas.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat for a rider of a motorcycle having a fuel supply port disposed on a lower side of said seat, comprising:
   a pad constituting a part of said seat,
   wherein said pad is pivotably mounted on said seat and includes a separately rotatable portion for covering and uncovering an upper side of said fuel supply port with respect to an exterior of the motorcycle; and
   wherein when said fuel supply port is uncovered with respect to the exterior, said separately rotatable portion of said pad is capable of functioning as a backrest for the rider.

2. A seat for a rider of a motorcycle having a fuel supply port disposed on a lower side of said seat, comprising:
   a pad constituting a part of said seat, said pad being supported by a support member so as to be displaceable between a closed position on an upper side of said fuel supply port and an open position away from said upper-side position so as to open said fuel supply port to a motorcycle exterior; and
   said pad and said support member are disposed so as to sink to the lower side of said seat from an upper surface of said seat when said pad is located in the closed position relative to said upper-side position.

3. The seat for a rider of the motorcycle as set forth in claim 2, wherein said pad is displaceable by swiveling said support member, and the position of said pad is set so that said pad functions as a backrest for the rider when said support member is displaced to an upright position.

4. The seat for a rider of the motorcycle as set forth in claim 2, wherein said support member is pivotally supported on a rear part of a pillion; and
   when said pad is displaced to said position on the upper side of said fuel supply port, said support member sinks into a longitudinal recess formed in an upper surface of said pillion and said pad sinks into a crosswise recess formed between a driver's seat portion of said seat and said pillion.

5. The seat for a rider of the motorcycle as set forth in claim 2, wherein said pad has a cushion part, and said pad and said support member are linked to each other so that said cushion part faces upwards when said pad is in said position on the upper side of said fuel supply port, and said cushion part is turned to be displaced to the lower side and to face forwards when said support member is in an upright position.

6. The seat for a rider of the motorcycle as set forth in claim 2, wherein said motorcycle is a fuel cell powered vehicle; and said fuel supply port is a charge port through which a hydrogen gas reservoir tank is charged with hydrogen gas which is used in a fuel cell.

7. The seat for a rider of the motorcycle as set forth in claim 2, wherein said pad is operatively connected to said seat to sink into a groove formed on the upper surface of said seat.

8. The seat for a rider of the motorcycle as set forth in claim 7, wherein the groove includes a longitudinally extending section and a transverse section, said support member being disposed within said longitudinally extending section and said pad being disposed within said transverse section in the closed position.

9. The seat for a rider of the motorcycle as set forth in claim 2, wherein said support member includes a longitudinally extending member with a distal end and a proximal end, said distal end being pivotably secured to a rear portion of the seat, said pad being secured to the proximal end for covering said fuel supply port in a closed position.

10. The seat for a rider of the motorcycle as set forth in claim 9, wherein when said support member is extended to an upright position, said pad is pivoted such that a cushion secured to said pad is facing forward for providing a back rest for the rider.

11. The seat for a rider of the motorcycle as set forth in claim 10, and further including a hook member for selectively securing said support member in said upright position.

12. The seat for a rider of the motorcycle as set forth in claim 2, wherein said seat further includes at least one output jack, said pad providing a cover for said at least one output jack when in the closed position.

13. A seat for a rider of a motorcycle having a fuel supply port disposed on a lower side of said seat, comprising:
   a pad for said seat for a rider, said pad being supported at both left and right ends thereof by a support member so as to be displaceable between a closed position on an upper side of said fuel supply port an open position away from said upper-side position so as to open said fuel supply port to the exterior; and
   said pad is disposed so as to sink to the lower side of said seat from an upper surface of said seat when said pad is located in the closed position relative to said upper-side position.

14. The seat for a rider of the motorcycle as set forth in claim 13, wherein said pad is operatively connected to said seat to sink into a groove formed on the upper surface of said seat.

15. The seat for a rider of the motorcycle as set forth in claim 13, wherein said support includes a longitudinally extending member with a distal end and a proximal end, said distal end being pivotably secured to a rear portion of the seat, said pad being secured to the proximal end for covering said fuel supply port in the closed position.

16. The seat for a rider of the motorcycle as set forth in claim 15, wherein when said support member is extended to an upright position, said pad is pivoted so that a cushion secured to said pad is facing forward for providing a back rest for the rider.

* * * * *